US012810443B2

(12) United States Patent
Montanaro et al.

(10) Patent No.: US 12,810,443 B2
(45) Date of Patent: Nov. 24, 2026

(54) METHOD AND SYSTEM THEREOF FOR DETECTING OBJECTS IN THE FIELD OF VIEW OF AN OPTICAL DETECTION DEVICE

(71) Applicant: Universita' Degli Studi Di Torino, Turin (IT)

(72) Inventors: Antonio Montanaro, Turin (IT); Mario Edoardo Bertaina, Turin (IT); Toshikazu Ebisuzaki, Saitama (JP)

(73) Assignee: Universita' Degli Studi Di Torino, Turin (IT)

( * ) Notice: Subject to any disclaimer, the term of this patent is extended or adjusted under 35 U.S.C. 154(b) by 322 days.

(21) Appl. No.: 18/556,159

(22) PCT Filed: Apr. 15, 2022

(86) PCT No.: PCT/IB2022/053571
§ 371 (c)(1),
(2) Date: Oct. 19, 2023

(87) PCT Pub. No.: WO2022/224111
PCT Pub. Date: Oct. 27, 2022

(65) Prior Publication Data
US 2024/0185438 A1 Jun. 6, 2024

(30) Foreign Application Priority Data
Apr. 19, 2021 (IT) ........................ 102021000009845

(51) Int. Cl.
*G06T 7/246* (2017.01)

(52) U.S. Cl.
CPC .... *G06T 7/248* (2017.01); *G06T 2207/10016* (2013.01); *G06T 2207/30241* (2013.01)

(58) Field of Classification Search
CPC .... G06V 10/62; G06V 10/82; G06V 2201/07; G06T 7/248; G05T 2207/30241; G05T 2207/10016
See application file for complete search history.

(56) References Cited

U.S. PATENT DOCUMENTS

2017/0358103 A1* 12/2017 Shao ......................... G01S 3/00
2020/0082156 A1 3/2020 Dehghan et al.
2020/0174094 A1* 6/2020 Tchilian .................. G01S 5/163

FOREIGN PATENT DOCUMENTS

WO WO 2020/197508 A1 10/2020

OTHER PUBLICATIONS

PCT International Search Report and Written Opinion dated Jul. 18, 2022 for PCT Application No. PCT/IB2022/053571.

* cited by examiner

*Primary Examiner* — Tracy Mangialaschi
(74) *Attorney, Agent, or Firm* — McCarter & English, LLP

(57) ABSTRACT

A computer-implemented method for detecting objects in the field of view of an optical detection device is provided that includes (i) acquiring, through the optical detection device, a plurality of subsequent frames of a portion of an observed space in a time interval, wherein each frame is acquired in a corresponding time instant of the time interval; (ii) selecting a subset of frames from the plurality of frames; (iii) for each set of values of shifting parameters of a plurality of sets of values of shifting parameters that are indicative corresponding predetermined motions of an object with respect to the optical detection device, determining a corresponding first stacked frame on the basis of the subset of frames and as a function of the set of values of the shifting parameters; (iv) for each first stacked frame, determining whether the first stacked frame belongs to a first
(Continued)

or a second class, wherein the first and the second class are respectively indicative of the presence or absence of an image of an object in the first stacked frame; and (v) selecting, among the sets of values of shifting parameters, each set of values of shifting parameters that is associated to corresponding first stacked frame classified as belonging to the first class. The method further includes, for each selected set of values of shifting parameters: (i) determining a corresponding second stacked frame on the basis of the set of frames and as a function of the selected set of values of shifting parameters; (ii) for each second stacked frame, determining whether the second stacked frame belongs to a third or a fourth class wherein the third and the fourth class are respectively indicative of the presence or absence of an image of an object in the second stacked frame; (iii) determining if the first stacked frame classified as belonging to the first class and in the second stacked frame classified as belonging to the third class meet a requirement; and (iv) if the requirement is met, indicate the presence of an object.

10 Claims, 4 Drawing Sheets

METHOD AND SYSTEM THEREOF FOR DETECTING OBJECTS IN THE FIELD OF VIEW OF AN OPTICAL DETECTION DEVICE

CROSS-REFERENCE TO RELATED APPLICATIONS

This Patent Application is a 35 U.S.C. § 371 National Stage filing of International Application No. PCT/IB2022/053571, filed on Apr. 15, 2022, which application claims priority from Italian Patent Application No. 102021000009845 filed on Apr. 19, 2021, the entire disclosure of which is incorporated herein by reference.

TECHNICAL FIELD OF THE INVENTION

The invention relates to a method and a system thereof for detecting objects in the Field of View (FoV) of an optical detection device, such as a telescope or a camera (e.g., a CCD, Charge-Coupled Device, camera); in particular, the present invention relates to a method and a system thereof for detecting objects in space, in particular space debris and other physical space entities, such as asteroids, meteors and the such, moving in the FoV of a telescope or a CCD camera.

In particular and without any loss of generality, the present invention relates to the detection of any point-like source moving linearly in the field of view of a telescope, e.g. Mini-EUSO (Multiwavelength Imaging New Instrument for the Extreme Universe Space Observatory or "UV atmosphere" in the Russian Space Program) telescope, or a camera, e.g. a CCD (Charge-Coupling Device) camera; it is further assumed in the following that the trajectory of the objects in space is not necessarily known a priori.

State of the Art

Over the last sixty years, since man began to explore space, several thousand of satellites and missiles have been launched; as of recent, there are about 18000 objects in orbit, of which approximately 1100 of them are still in operation, while the remaining may be classified as space debris. In particular, space debris mainly comprises derelict satellites, parts of rockets and space vehicles, no longer in use, and that remain in orbit around the Earth. These objects travel at high speeds, typically of the order of 7-9 km/s near the Low Earth Orbit; given their speed and position with respect to other operative satellites and missiles, space debris may collide with spacecrafts, such as the ISS, or other manned or unmanned spacecrafts, damaging them and eventually producing new debris in turn, thus populating the Low Earth Orbit with even more space debris.

Furthermore, the great majority of these space debris are not catalogued and, even if they were, tracking data obtained through tracking devices (such as detectors, e.g. optical detection devices, such as telescopes and/or cameras) relating to these space debris are usually not precise enough to know their position, both in terms of time and space.

Additionally, most space debris have dimensions of the order of few centimetres when observed with devices such as telescopes and do not emit light on their own, making them difficult to detect. Thus, space debris has to be illuminated or detected at certain times to be sure that a light signal is acquired.

Furthermore, as observed by the Applicants, given a light signal indicative of an object in space moving in the focal surface of an optical detection device, which acquires frames of the observed portion, if such light signal has a Signal-to-Noise Ratio (SNR) less than, e.g., three (in particular, in the case of the Mini-EUSO), such light signal might not be visible and detectable in one single frame because it could be absorbed by fluctuations of background; typically, these fluctuations of the background follow a Poissonian behaviour and are referred to as background noise or background signal.

In the known art, systems and methods for tracking space debris are provided.

For the purpose of identifying space debris and other objects in space, stacking techniques are known. In particular, stacking methods are based on shifting the frames acquired by an optical detection device and adding each shifted frame on top of each other; the stacking methods are carried out starting from single frames wherein the object in space (represented as a light signal) is shown, according to the movement of the observed signal, e.g. in terms of speed, angular direction, etcetera. In other words, considering the possible movements of an object, stacking methods allow to generate additional frames (in particular, by shifting the frames acquired by the optical detection device according to a certain set of parameters) and add them on top of a frame wherein an object is first detected, thereby obtaining combination or stacked frames which allow to achieve a clearer light signal associated with the object to be observed and identified, thereby incrementing the SNR. Since space debris does not emit light, to ensure a correct detection, the space debris has to clearly appear in all the frames; in this way, the SNR is incremented, i.e. the signal (here a light signal) relative to the space debris is greater in magnitude than the background noise, i.e. the noise caused by background signal. To do so, the detection may occur in different times of the day, for instance at dawn or dusk when the high atmosphere is already illuminated by the sunlight and the Earth is still in umbra.

It is also known that, in the paper "*Comparison Between Four Detection Algorithms For GEO Objects*" by Yanagisawa et al., four different strategies, which are based on the application principles of the stacking methods, have been presented to detect space debris by means of an optical detection device, such as a CCD camera, positioned on Earth:

1. PC-based stacking method, wherein numerous CCD images are used to detect faint objects (here space debris) below the limiting magnitude of a single acquired CCD image. In particular, sub-images are cropped starting from the numerous CCD images acquired by the CCD camera to fit the movement of the objects. In the end, an average image of all the sub-images is created. The main drawback of the PC-based stacking method is the considerable amount of time for detecting objects, even faint ones;
2. FPGA (Field Programmable Gate Array)—based stacking method, wherein an algorithm installed in a FPGA board is configured to operate in a similar way as the previous PC-based stacking method, differentiating from the latter only in terms of used hardware (which may conveniently be used on board of the optical detection device) with the advantage that the FPGA-base stacking method reduces the analysis time about one thousandth of PC based stacking method. However, the FPGA-based stacking method has a limited amount of functions and its computational cost increases with the complexity of operations to be implemented; furthermore, even if operations may be parallelized to have a better efficiency, the implementation of corresponding source codes is more complex than in PC-based stacking methods;

3. line-identifying technique, which emerges from an optical flow algorithm (as disclosed, e.g., in "*A debris image tracking using optical flow algorithm*" by Fujita et al.), which is configured to track luminous events (i.e., light signals in the FoV of an optical detection device) and works in a similar way as the PC-based and the FPGA-based stacking methods, wherein several CCD frames are analyzed and any series of objects which are arrayed on a straight line from the first frame to the last frame is detected. While the line-identifying method analyses data faster than the PC-based and FPGA-based stacking methods, the line-identifying method does not detect faint objects; and
4. multi-pass multi-period algorithm, which operates similarly to the previous methods and wherein, instead of the average image generated by the previous methods, the average image of all of the sub-images is generated. The multi-pass multi-period algorithm has the same analysis speed as the line-identifying technique but better detection capabilities in terms of darkness, i.e. it is able to detect faint objects on dark backgrounds.

For the purpose of tracking space debris and, more in general, objects in the FoV of an optical detection device with a linear motion and constant luminosity, the strategy based on the line-identifying technique is typically used. Nonetheless, the detection capabilities of the line-identifying technique has a lower performance than the PC-based and the FPGA-based stacking methods.

Furthermore, as also pointed out above, the first and second strategies, i.e. the PC-based and the FPGA-based stacking methods, allow to find fainter space debris (i.e., space debris that are not clearly visible from single CCD frames alone, meaning that the associated light signal is less visible with respect to the background noise) with the drawback of the computational time invested for finding such space debris, which is greater for the PC-based stacking method than the FPGA-based stacking method.

To solve the issue of the computational time in any of the previously cited known methods, it may be assumed to know the object trajectory a priori; however, such assumption is not realistic, since the trajectory of a space debris or any further object in space, such as, e.g., asteroids, is not always known or it cannot always be predicted or assumed. Therefore, since knowing the trajectory a priori is an assumption which does not represent real situations, the abovementioned stacking methods are configured to produce several combined or stacked frames from the acquired frames according to any movement parameter (such as speed and angular direction) of the space debris, represented as a light signal.

Furthermore, to select the correct combinations of frames and parameters generated by the stacking method, decision algorithms (such as SBR, Signal-over-Background Ratio, enhancement), which are based on applying a threshold on the value of light signals, have been used; however, such algorithms may lead to threshold cuts (i.e. faint light signals may be considered as part of a background signal, since their intensity is lower than the preset threshold) with high computational time and loss of efficiency due to the threshold cuts.

US patent US 2020/082156 A1 discloses techniques to provide efficient object detection and tracking in video images, such as may be used for real-time camera control in power-limited mobile image capture devices. The techniques include performing object detection on a first subset of frames of an input video, detecting an object and object location in a first detection frame of the first subset of frames, and tracking the detected object on a second subset of frames of the input video after the first detection frame, wherein the second subset does not include frames of the first subset.

SUBJECT AND SUMMARY OF THE INVENTION

The object of the invention is to provide a method and a system that allow for detecting objects in the FoV of an optical detection device, in particular objects in space, more in particular space debris, in order to recognise the presence of such objects in space and, thus, to prevent any damage to any operative satellite or missiles in space.

In particular, the present invention aims at providing a method and a relative system with good and fast computational abilities, that can be used without necessarily assuming that the trajectory of the object in space is known a priori and, in general, that allow to solve the issues of the prior art.

According to the invention, there are provided a method and a system thereof for detecting objects in the FoV of an optical detection device, as according to the attached claims.

BRIEF DESCRIPTION OF THE DRAWINGS

The invention will now be described with reference to the accompanying drawings, showing a non-limiting embodiment thereof, wherein.

DETAILED DESCRIPTION OF PREFERRED EMBODIMENTS OF THE INVENTION

The present invention will now be described in detail with reference to the attached figures to allow a skilled person to make and use it. Various modifications to the embodiments described will be immediately apparent to skilled person and the generic principles described can be applied to other o embodiments and applications without thereby departing from the scope of the present invention, as defined in the attached claims. Therefore, the present invention should not be considered limited to the embodiments described and illustrated herein, but should be accorded the broadest scope of protection consistent with the described and claimed features.

Unless otherwise defined, all technical and scientific terms used herein have the same meaning commonly used by persons of ordinary experience in the field pertaining to the present invention. In the event of a conflict, this description, including the definitions provided, will be binding.

Furthermore, the examples are provided for illustrative purposes only and as such should not be regarded as limiting.

In particular, the block diagrams included in the attached figures and described below are not intended as a representation of the structural characteristics, or constructive limitations, but must be interpreted as a representation of functional characteristics, i.e. intrinsic properties of the devices and defined by the effects obtained or functional limitations and which can be implemented in different ways, therefore in order to protect the functionality of the same (possibility of functioning).

In order to facilitate the understanding of the embodiments described herein, reference will be made to some specific embodiments and a specific language will be used to describe them. The terminology used herein has the purpose of describing only particular embodiments, and is not intended to limit the scope of the present invention.

For the sake of simplicity, in the following only space debris will be considered; it is however pointed out that, as also anticipated above, such simplification is not intended as limitative but rather to allow a better comprehension of the present invention. Thus, other entities in space, such as asteroids or meteors, may be detected by the present system and through the present method.

Figure 1:
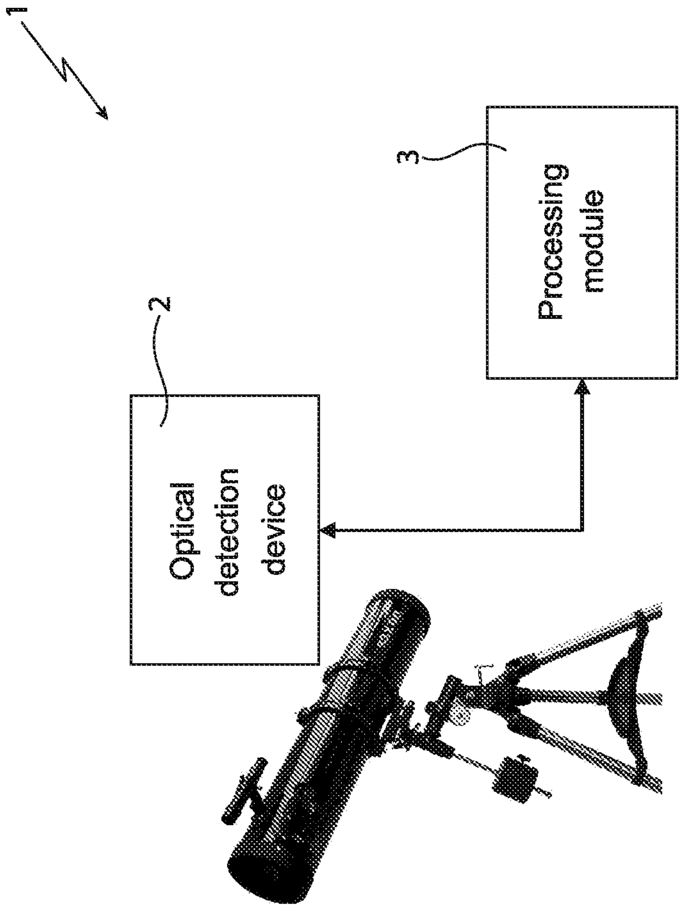
FIG. 1 shows a schematic of a system for detecting objects in space according to an embodiment of the present invention.

FIG. 1 schematically shows a system 1 according to an embodiment of the present invention and comprising:

- an optical detection device 2, hereinafter also referred to as device 2, for acquiring light signals and generating sets of frames F from the light signals relating to a portion of the observed space where an object may be found; and
- a processing module 3, coupled to the device 2 and configured to receive the sets of frames F acquired by the device 2 and process them to determine whether an object is present and is moving in the portion observed by the device 2.

The device 2 is e.g. a telescope, for instance the Mini-EUSO; in detail, for the purpose of finding space debris moving in the Low Earth Orbit, the latter is installed on the nadir-facing UV transparent window in the Russian Zvezda module of ISS and is configured to operate in the UV range (i.e., between 290 nm and 430 nm) with a square field of view of approximately 44° and a ground resolution of approximately 6 km.

In further embodiments of the present invention, the device 2 may be another type of detection device, e.g. a CCD camera or a further telescope on Earth; the main difference between the different types of optical detection devices lies in the periodicity at which the sets of frames F are acquired. In the following, for better understanding the present invention, it is assumed, without any loss of generality, that the optical detection device 2 is a telescope, in particular the Mini-EUSO.

As also anticipated above, since space debris do not emit light on their own but only reflect it, the device 2 is configured to detect the reflected light from the space debris illuminated by a light source, e.g. an external light source such as a laser or other light sources such as the sun or the moon, thereby exploiting the albedo effect and detecting the space debris e.g. in the form of tracks crossing the FoV of the device 2 (i.e. sequential frames F show the space debris crossing the FoV of the device 2, each frame F showing the space debris in a position at a different time instant). Where the device 2 is the Mini-EUSO telescope and considering the sun as the light source, space debris could be tracked either at sunrise or sunset (i.e., wherein the Earth is still in umbra while the high atmosphere is already illuminated by the sun) or with the ISS turned by 90° or 180°, with the sun shining from the back to avoid direct sunlight; the latter case occurs if, for instance, the device 2 is not properly shielded like in the former case.

Furthermore, in order to acquire multiple frames F and thus detect the motion of the object, the device 2 is configured to acquire frames F periodically; for instance, in the case when the device 2 is the Mini-EUSO telescope, the acquisition of the frames F occurs every couple of weeks for at least three years (the latter being the life expectancy of the Mini-EUSO since its installation on the ISS). In general, the device 2 is configured to acquire frames F relating to a portion of the observed space continuously according to a periodicity t (i.e. a frequency for acquiring frames in time intervals T, when the device 2 is in use); in other words, the device 2 operates as a recorder for the observed portion of space, wherein frames F represent the spatial and temporal situation of the observed space. It is noted that the device 2 acquires frames F independently from the fact that an object, such as space debris, will or will not cross the FoV of the same device 2.

Figure 2:
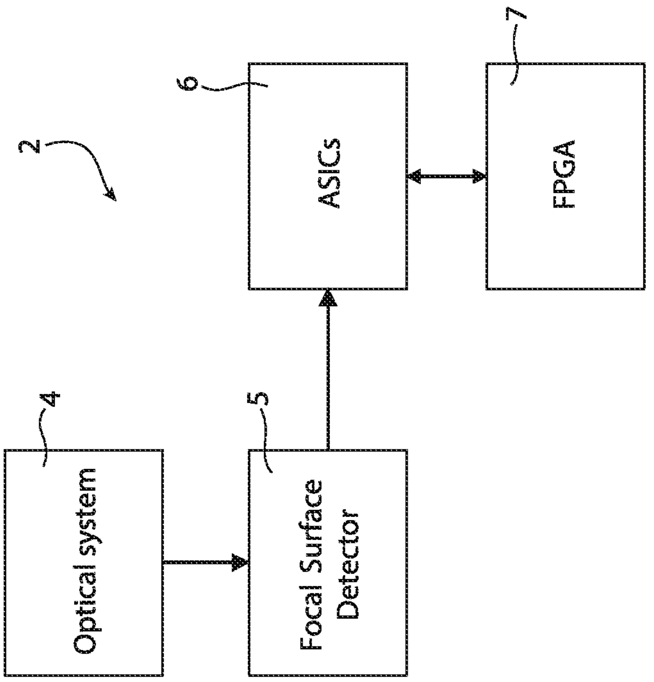
FIG. 2 shows a schematic of a detection device of the system according to FIG. 1.

As shown in FIG. 2, the detection device 2 comprises:

- an optical system 4 including a plurality of lenses (in the case of the Mini-EUSO telescope, two lenses, e.g. of the Fresnel type, with a diameter of 25 cm) and configured to focus light signals indicative of objects to be detected, e.g. space debris;
- a focal surface detector 5, e.g. a Photon Detector Module (PDM), or a mosaic of the latter, comprising a plurality of photomultipliers, such as MultiAnode Photomultipliers (MAPMTs) tubes (in the case of the Mini-EUSO, thirty-six), having a focal surface (not shown), coupled to the optical system 4 and configured to:
  - receive the focused light signals, wherein the photons of the latter impinge on the focal surface detector 5;
  - amplify the received focused light signals; and
  - convert the received focused light signals into corresponding electrical signals;
- a plurality of ASICs 6 coupled to the focal surface detector 5 and configured to receive and process the electrical signals received from the focal surface detector 5 in order to digitalize them and obtain the corresponding frames (in particular, in the case of the Mini-EUSO telescope, the plurality of ASICs 6 is configured to handle the readouts, i.e. the electrical signals, in temporal frames of, e.g., 2.5 μs and with a single photon discrimination of, e.g., 5 ns); and
- an FPGA 7 coupled to the plurality of ASICs 6 and configured to implement multiple level triggering regarding light transients and to allow the measurement of triggered light transients, i.e. to set the thresholds for recording each set of frames F in the time intervals T and, thus, for receiving the corresponding number of the light signals received by the device 2 (for instance, in the case of the Mini-EUSO, the FPGA 7 is configured to allow the measurement of UV transients for, e.g., 128 frames at time scales of both 2.5 μs and 320 μs).

Furthermore, the device 2 comprises an internal storage (not shown) configured to store the acquire frames.

It is noted that, where the device 2 is the Mini-EUSO telescope, such device 2 is capable of an untriggered acquisition mode wherein, with 40 ms frames, i.e. frames acquired with a periodicity t (also referred to, in the case of the Mini-EUSO, as a time unit equal to 40 ms, the latter also defined as one Gate Time Unit, abbreviated as GTU in the following), the device 2 continuously acquire sets of frames F; such modality is particularly used for detecting space debris in a portion of observed space. In other words, according to a time unit set, e.g., defined by the user through the FPGA 7, the device 2 is capable of a continuous acquisition of sets of frames F.

After acquiring a set of frames F, according to an aspect of the present invention, the device 2 is configured to process the set of frames F according to a stacking procedure, described in further detail in the following paragraphs, to generate a corresponding set of stacked frames; according to further aspect of the present invention, the stacking procedure is carried out by the processing module 3.

Again with reference to FIG. 1, once the device 2 has acquired the set of frames F and generated the corresponding set of stacked frames, the device 2 transmits each set of stacked frames to the processing module 3 which process them to generate outputs regarding the presence of space debris on the observed portion of space according to the method steps further explained below. In particular, for this purpose, the system 1, in particular the processing module 3, uses a convolutional neural network (CNN) algorithm.

According to another embodiment of the present invention, not described herein, the device 2 does not perform the stacking procedure; rather, the processing module 3 is configured both to perform the stacking procedure and to run the CNN algorithm as according to the method steps described hereinafter.

According to an aspect of the present invention, the processing module 3 is an off-board computer, for example a computer located on Earth and receiving the stacked frames from the device 2 through telemetry connection, which is specific for satellite communications. According to further aspect of the present invention, the processing module 3 is an on-board computer, i.e. a computer located, e.g., on the ISS. According to an even further aspect of the present invention, the processing module 3 corresponds to the FPGA 7 of the device 2; thus, the stacking procedure and the use of the CNN algorithm is performed on the device 2.

For a better understanding of the present invention, in the following it will be assumed that the device 2 and the processing module 3 are separate entities and, more in particular, that the processing module 3 is an on-board computer; however, this simplification is not limitative, since, unless specified differently, the working principles described herein are the same for any embodiment described herein.

With reference to FIGS. 3 and 4A-4C, a method according to an embodiment of the present invention is herein disclosed. In particular, the present method is based on a multi-level trigger algorithm, which in turn is based on a stacking procedure combined with a CNN, hereinafter referred to as stack-CNN method; in particular, the stack-CNN method may be applied to any point-like source moving linearly in the FoV of the device 2 of system 1.

According to an embodiment of the present invention, the stacking procedure of the present method is carried out by the plurality of ASICs 6 of the device 2 and the CNN algorithm is run by the processing module 3 in real-time, i.e. the device 2, while acquiring each frame of a set of frames F according to the trigger levels implemented by the FPGA 7, processes them and transmits them to the processing module 3, while continuing to acquire further frames of the same set of frames F or even further frames of further sets of frames F to be processed afterwards. In other words, the system 1 operates in a dynamic way, so that acquisition and processing may be carried out almost simultaneously; in the following, for simplicity and for a better understanding of the invention, it is assumed that the system 1 acquires the set of frames F and processes it according to the method steps described hereinafter.

According to an another embodiment of the present invention, the CNN algorithm is run on the processing module 3 offline, i.e. after acquiring and processing sets of frames F by means of the device 2 (i.e. after having reached a maximum number of frames F that may be acquired and processed by the device 2 according to the stacking procedure). It is noted that the maximum number of frames may be predetermined by a user by properly tuning the trigger levels to be implemented by the FPGA 7; furthermore, the device 2 may stop the acquisition of frames F automatically according to the user's predetermined maximum number of frames F that can be acquired by the device 2.

In the following, to allow a better comprehension of the invention, a single iteration of the present method will be described, i.e. a single set of frames F is acquired and processed by the system 1 according to the method steps described hereinafter.

Figure 3:
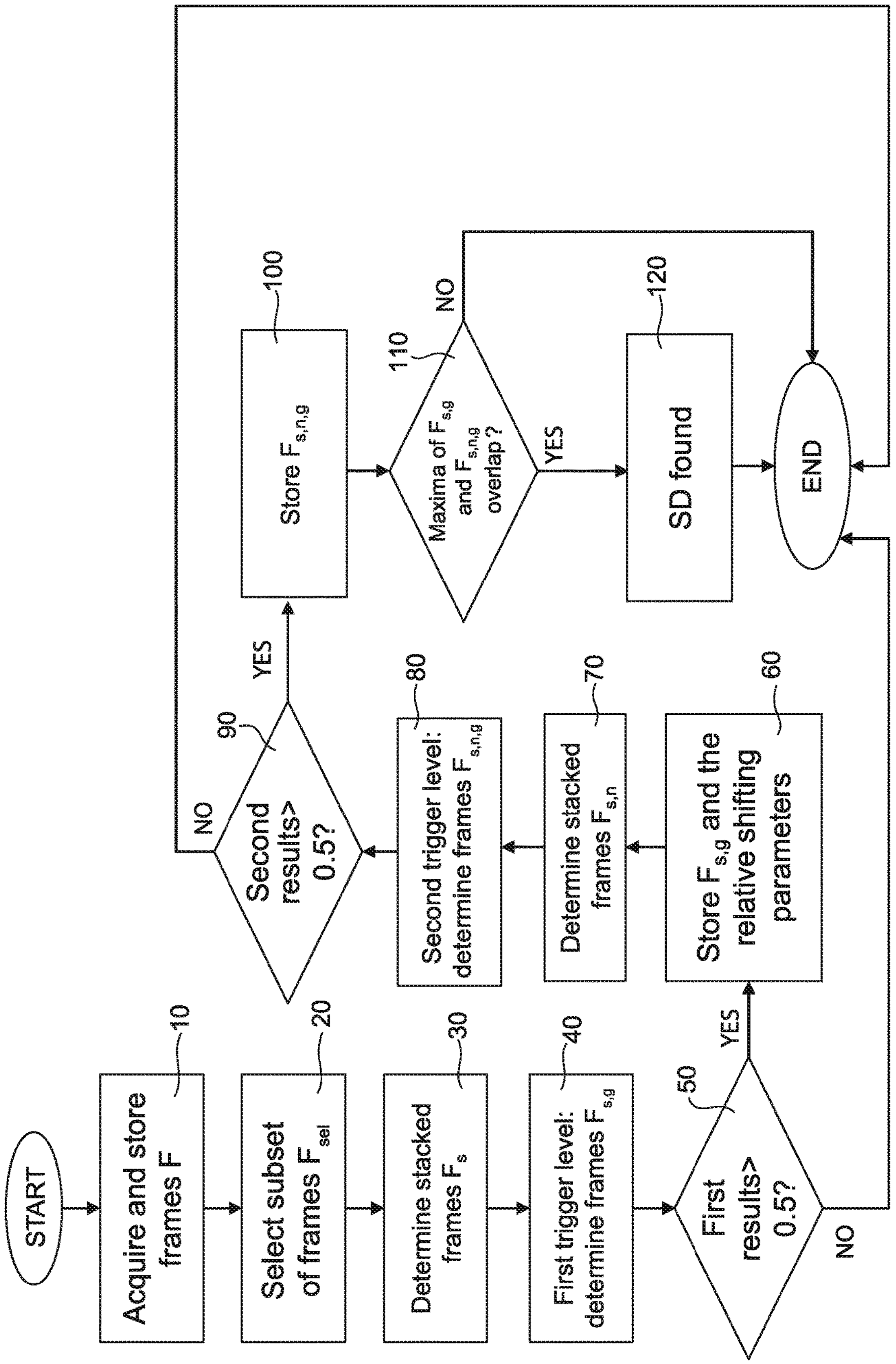
FIG. 3 shows a block diagram of the method for detecting objects in space according to an embodiment of the present invention.

FIG. 3 shows a flow diagram of the method for detecting objects in the FoV of the device 2 as according to the present invention.

Initially, step 10, the device 2 acquires and stores a set of frames F of an observed portion of the observed space, namely the portion covered by the FoV of the device 2 itself. In the following and without any limitation to the scope of the present invention, it is assumed that the frames F are subsequent one another, are acquired in the time interval T, which is a multiple of the periodicity t and it is determined according to the trigger levels pre-set by the FPGA 7. In the case of the Mini-EUSO, the time interval T is a multiple of the GTU. According to an aspect of the present invention, the frames F are sequential, i.e. the time interval between each frame F is equal to the periodicity t; according to a further aspect of the present invention, the frames F are not sequential, i.e. the time interval between each frame F varies according to multiples of the periodicity t. For a better understanding of the invention, hereinafter it is assumed that the frames F of the set of frames F are sequential one another.

For detecting space debris (and, more in general, objects crossing the FoV of the device 2), it is assumed that the motion of space debris is described by quantities relating to its trajectory and its velocity, whose values are assumed according to previous observations (i.e., since some space debris has been observed and catalogued, the quantities describing its motion in the Low Earth Orbit and their values are also catalogued). In other words, considering that space debris might or might not cross the FoV of the device 2, it is assumed that, if space debris orbiting Earth on the Low Earth Orbit is detected by the system 1, the motion of said space debris is described by sets of quantities relating to its trajectory and velocity. It is noted that this assumption is also valid for space debris that has not been catalogued and that moves in the Low Earth Orbit. According to a further aspect of the present invention, the stack-CNN algorithm described herein is also suitable for detecting objects moving in higher Earth orbits.

In particular, here, it is assumed that the space debris moves at speed $|\vec{v}|$ and along an angular direction θ, the latter being a direction resting on a plane (for example, a plane parallel to plane XY of a Cartesian reference system XYZ, substantially parallel to the plane describing the FoV of the device 2) measured as an angle between, e.g., the X-axis and the projection of the position in the XY plane of the space debris considered. It is noted that the speed $|\vec{v}|$ and the angular direction θ associated with the motion of the space debris, in particular in the Low Earth Orbit, are not point values, i.e. the values of the speed $|\vec{v}|$ and the angular direction θ are ranges of possible values, as also specified in the following paragraphs. In particular, such values for the speed $|\vec{v}|$ and the angular direction e are determined according to the relative motion of the space debris with respect to the device 2 and are thus indicating of the trajectory and the speed of the space debris.

To allow a better comprehension of the present invention and considering the intrinsic characteristics of the device 2 (i.e., given the nature of the device 2), detection of speed $|\vec{v}|$ of the space debris on the plane of the FoV of the device 2 (i.e., the XY plane of the Cartesian reference system XYZ) is possible. Therefore, it is assumed that space debris only has a horizontal speed, i.e., given the characteristics of the device 2, only the projections of the speed $|\vec{v}|$ on the XY plane (i.e., the X and Y components of the speed $|\vec{v}|$ on the plane of the FoV of the device 2) are considered, and that it starts moving from a position defined by the Cartesian coordinates ($x_0$, $y_0$, h), wherein $x_0$, $y_0$ are the X and Y coordinates of the origin of the Cartesian reference system XYZ and h is the height (measured in km along the Z-axis) of space debris observed by the device 2. Thus, if the height h is null, then space debris is on positioned on the ground, i.e. on Earth.

At height h, the size $l_p$ of a pixel of each frame F acquired by the device 2 is calculated knowing the altitude a of the device 2 (e.g., 400 km for the Mini-EUSO) and the size $l_g$ of a pixel of each frame F when measured on the ground (e.g., 6 km), as well as the aperture angle α of one pixel, the latter being related to the FoV of the device 2 and consequently to the FoV of the pixels of each frame F acquired by the device 2. Therefore, the size of a pixel $l_p$ of each frame F acquired by the device 2 is defined as follows (Equation (1)):

$$l_p = (a-h)\times\tan(\alpha) = \frac{a-h}{a}\times l_g \tag{1}$$

It is noted that the FoV of the device 2, which is known from the data sheet of the device 2, is defined as the sum of the FoV of each pixel forming a frame F acquired by the device 2.

In particular, the set of frames F acquired by device 2 comprises n+1 frames F which are acquired in the time interval T, i.e. from a first time instant $T_0$, which is the time instant wherein the first frame of the set of frames F is acquired, up to a second time instant $T_n$, which is the time instant in which the last frame is acquired by the device 2. In particular, time instants in the time interval T, i.e. from the first time instant $T_0$ to the second time instant $T_n$ (extremes included) depend on the periodicity t (in the case of the Mini-EUSO, on the GTU); thus, according to an aspect of the present invention, the first time instant $T_0$ is equal to the values of the periodicity t (i.e., in the case of the Mini-EUSO, one GTU, i.e. 40 ms), and the second time instant Tn is equal to the values of the periodicity t multiplied by n (in the case of the Mini-EUSO, n times GTU).

In other words, the device 2 is configured to acquire the set of frames F in the time interval T, delimited by time instants $T_0$ and $T_n$, according to the periodicity t.

Thus, said set of frames F is stored in the device 2, e.g. in an internal storage (not shown).

For a better understanding of the invention, it is assumed that the time instants $T_0$, $T_n$ are respectively the time instant at which the space debris is detected for the first and last time; thus, the time interval T is the temporal frame in which the space debris is detected by the device 2. Once again, this simplification is not limitative for the scope of the present invention, but rather it is made to allow a better comprehension of the present invention itself.

Furthermore, it is noted that the device 2 acquires the set of frames F as bi-dimensional images extending on a plane parallel to, e.g., the XY plane of the Cartesian reference system and, thus, to the plane representing the FOV of the device 2.

Following, a map I ($T_i$), which is a $N_M \times M_M$ (where $N_M$ and $M_M$ are natural indexes ranging from 1 to $N_{M,max}$ and $M_{M,max,}$ the latter being the maximum values for the dimensions of the map I ($T_i$) defined by the characteristics of the device 2) map at time instant $T_i$ (wherein i is an index comprised between 0 and n) comprised between time instants $T_0$, $T_n$ and thus being a multiple of the periodicity, i.e. equal to the value of the periodicity t and index i, is obtained; it is noted that, in the case of the Mini-EUSO, the map I ($T_i$) is a 48×48 map, i.e. $N_M$ and $M_M$ are the same. According to a further aspect of the present invention, the dimension of the map I ($T_i$) may be tailored accordingly, i.e. if the dimension of the corresponding frame $F_i$ is huge (i.e., 1000×1000), then the same frame $F_i$ may be cut to a desired size, which thus determines the size of the corresponding map I ($T_i$), so that the method described herein can be carried out in a faster and more efficient way. For a better understanding of the present invention, it is assumed that the map I ($T_i$) is a $N_M \times N_M$ map.

Figure 4A:
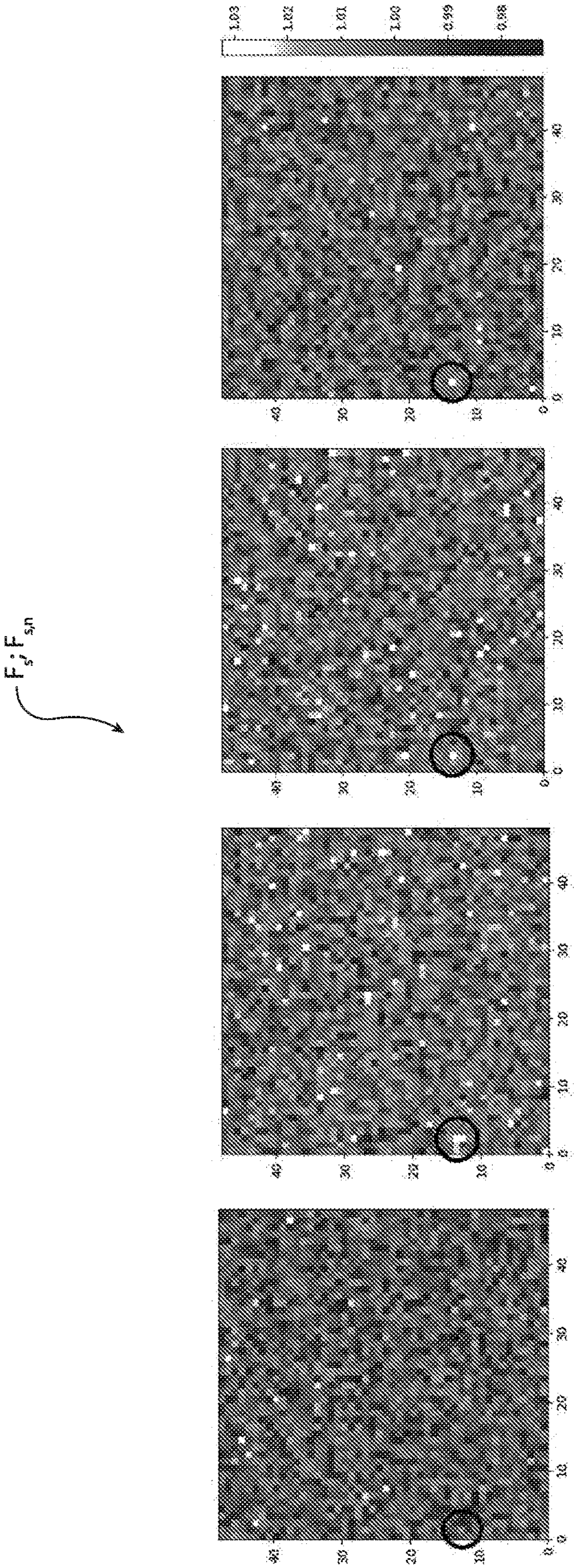
FIG. 4A shows an example of acquired frames according to a step of the method of FIG. 3 and a background frame.
Figure 4C:
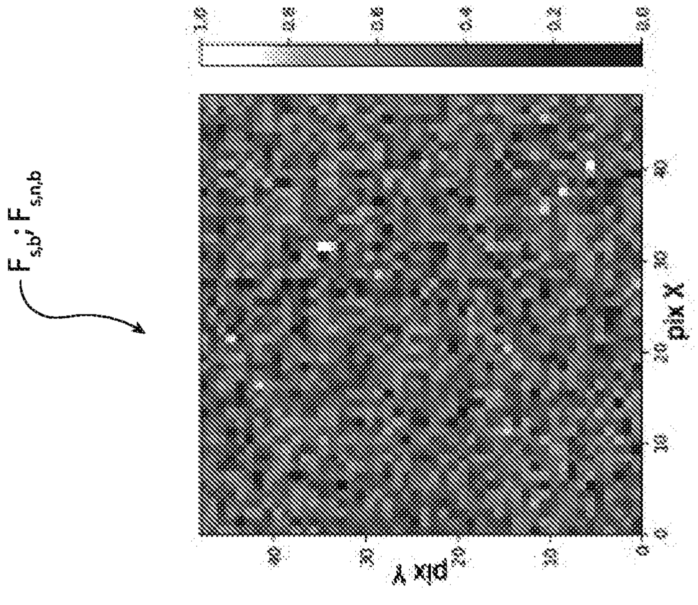
FIG. 4B-4C show examples of stacked frames according to a step of the method of FIG. 3 and a background frame.
Figure 4B:
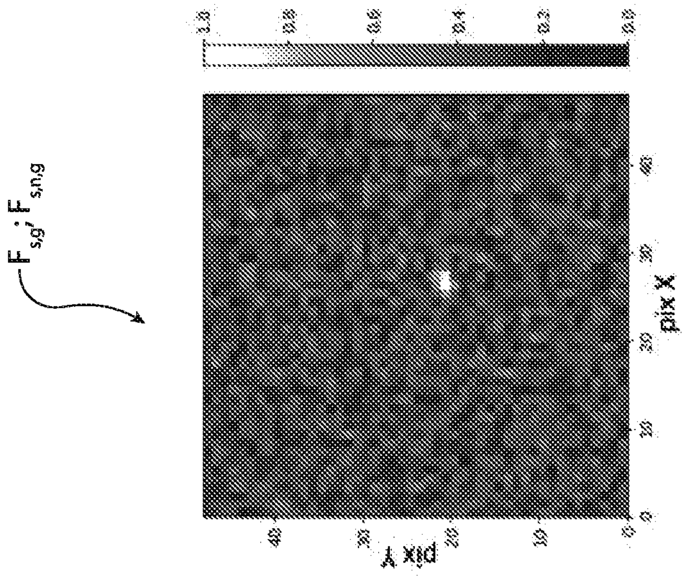

In particular, the map I ($T_i$) represents, in a matrix form, frame $F_i$, which is one of the frames F of the set of frames acquired by the device 2. Furthermore, a time difference Δt which is a time difference between adjacent time instants (here thus being equal to the periodicity t and, in the case of the Mini-EUSO, defined as the time difference between two GTUs) is also provided. In the end, the device 2 is configured to generate n+1 maps I ([$T_0$−$T_n$]) (also referred to as I (T) in the following) each representing a corresponding frame F of the set of frames F acquired in the time interval T. Examples of acquired frames F of the set of frames F are shown in FIG. 4A (wherein the presence of the space debris is indicated by a circle).

For instance, set of frames F comprises fourty frames F; therefore, the number of maps I (T) is equal to fourty. The set of frames F are stored, for example, in the internal storage of the device 2.

In general, the set of frames F comprises a corresponding first frame $F_0$, which is the frame acquires at the first time instant $T_0$, and a corresponding further set of frames $F_B$ (B being a natural index comprised between 1 and n) acquired at respective time instants $T_B$ and subsequent, in particular sequential, one another and describing the progression in time of the motion of the space debris observed by the device 2.

Following, step 20, a subset of frames $F_{sel}$ selected from the set of frames F is selected for the following stacking procedure. In particular, the subset of frames $F_{sel}$ comprises $N_F$ (a natural index ranging from 1 to n−1) frames F; for example, in the present disclosure and without any limitation thereof, the subset of frames $F_{sel}$ comprises twelve frames F. For a better understanding of the present invention, it is assumed that the subset of frames $F_{sel}$ comprises the first twelve frames F acquired by the device 2 (i.e., frames F acquired in the time interval delimited by time instants $T_0$ and $T_{11}$); thus, the subset of frames $F_{sel}$ comprises the first frame $F_0$ and a number, here eleven, further frames $F_B$ (namely, frames $F_1$-$F_{11}$), hereinafter referred to as further subset of frames $F_{sel}'$, associated with the corresponding matrices I ($T_0$)–I ($T_{11}$) and the corresponding time instants $T_0$-$T_{11}$.

The stacking procedure according to the present invention and described with reference to step 30 of FIG. 3 comprises:

a shifting step; and an addition step.

In particular, the stacking procedure is iterative, meaning that the shifting and addition steps are repeated for the selected frames $F_{sel}$ processed in the stacking procedure. As also anticipated above, hereinafter a single iteration will be described.

According to the shifting step, the pixels of each frame $F_{sel}$ of the subset of frames $F_{sel}$, for instance frame $F_1$ represented by the map I ($T_1$) taken at time instant $T_1$ are shifted of according to a corresponding set of a first shifting distance dx along the X-axis and of a second shifting distance dy along the Y-axis, to obtain corresponding shifted frame $F_{sh1}$.

In particular, each set of shifting distances dx, dy is determined as a function of the values of the quantities describing the motion of the space debris in the FoV of the device; in particular, each set of the shifting distances dx, dy is determined as a function of a respective set of shifting parameters.

In detail, according to an aspect of the present invention, each set of shifting parameters comprises corresponding values for speed $|\vec{v}|$ and angular direction θ, which are assumed according to the values for speed and angular direction assumed by catalogued space debris. In particular, the angular direction θ is defined as the angle characterising the direction of the motion of the space debris in the plane wherein the latter moves, i.e. a plane parallel to the XY plane.

Thus, each set of shifting distances dx, dy are determined according to combinations, here pairs, of values of the shifting parameters, here speed $|\vec{v}|$ and angular direction θ. Thus, for a plurality of shifting parameters $|\vec{v}|$, θ, a corresponding plurality of shifting distances dx, dy is obtained.

In the following, for representing the motion of space debris, the values of the speed $|\vec{v}|$ are comprised between 5 and 11 km/s and shifting is performed considering steps of 2 km/s (for a total of four possible values for the speed $|\vec{v}|$); furthermore, the values of the angular direction θ are comprised between 0° and 360° and shifting is performed considering steps of 15° (for a total of twenty-four possible values for the angular direction θ).

Thus, each set of shifting distances dx, dy is determined as according to Equations (2) and (3) below:

$$dx_Q = |\vec{v_M}| \times \Delta t \times \cos(-\theta_N) \tag{2}$$

$$dy_Q = |\vec{v_M}| \times \Delta t \times \sin(-\theta_N) \tag{3}$$

wherein M is a natural index ranging from 0 to $M_{max}$, the latter being the maximum number of values that can be assumed by the speed $|\vec{v}|$; N is a natural index ranging from 0 to $N_{max}$, the latter being the maximum number of values that can be assumed by the angular direction θ; and Q is a natural index ranging from 0 to $Q_{max}$, the latter being the maximum number of possible values for the shifting distances $dx_Q$, $dy_Q$. In particular, the values of Q are given as the product between N and M; thus, $Q_{max}$ is the product between $N_{max}$ and $M_{max}$.

In other words, given combinations, in particular pairs, of values of the shifting parameters $$|\vec{v_M}|$$

and $\theta_N$, it is possible to find corresponding sets of values of the shifting distances $dx_Q$, $dy_Q$. In this case, the possible combinations/pairs of values of the shifting parameters $$|\vec{v_M}|$$

and ON is equal to ninety-six and, thus, the number of sets of shifting distances $dx_Q$, $dy_Q$ is ninety-six.

Thus, according to the present invention, the shifting procedure shifts the pixels of each frame $F_{sel}$ in a direction which is opposite to the direction of the motion of the space debris. In this way, as also explained in further detail in the following paragraphs, for a corresponding set of shifting distances $dx_Q$, $dy_Q$ (and thus a corresponding set of shifting parameters $$|\vec{v_M}|$$

and $\theta_N$), a corresponding first set of shifted frames $F_{sh}$, generated from the subset of frames $F_{sel}$ and corresponding to corresponding maps I $(T)_{sh}$, are generated. It is noted that the shifting step also takes into account the difference between the time instants of the first frame $F_0$ and the considered further frame $$F'_{sel};$$

in fact, since the objective is to render the object more visible, each further frame $$F'_{sel}$$

is shifted backwards, i.e. to approximately return to the position of the object of the first frame $F_0$, for a corresponding set of shifting distances $dx_Q$, $dy_Q$ (and thus a corresponding set of shifting parameters $$|\vec{v_M}|$$

and $\theta_N$) and by considering how much time has passed. Consequently, when shifting, the cardinality of the time instant at which each further frame $$F'_{sel}$$

is acquired has to be taken into account. Therefore, the higher the difference, the higher the pixels of each further frames $$F'_{sel}$$

have to be shifted backwards to be effectively overlapped in the stacking step on the first frame $F_0$, as described in further detail below.

Thus, for example, frame $F_1$ of the subset of frames $F_{sel}$ generates, when shifted according to a first set of values of speed $$|\vec{v_1}|$$

and angular direction $\theta_1$ and according to time difference $T_0$-$T_1$ which is equal to the value of the periodicity t (i.e., for the mini-EUSO, 40 ms) since it is positioned right after the first frame $F_0$ (i.e., the cardinality of its position is equal to one), a corresponding shifted frame $F_{sh1}$. For instance, the values of speed $$|\vec{v_1}|$$

and angular direction $\theta_1$ are respectively equal to 5 km/s and 0°, which are the first, possible values for the shifting parameters $$|\vec{v_M}|$$

and $\theta_N$ in the present case.

It is also noted that the shifting step is applied by considering that each pixel of each frame $F_{sel}$ is shifted starting from its centre.

With reference to the addition step, if the first and/or the second shifting distances $dx_Q$, $dy_Q$ are smaller than $l_p/2$, then each map I $(T)_{sh}$, which is a matrix relative to a corresponding shifted frame $F_{sh}$, is not rolled; on the other hand, each map I $(T)_{sh}$ is rolled by one or two pixels having the size $l_p$ depending on whether the first and/or the second shifting distances $dx_Q$, $dy_Q$ are bigger than $l_p/2$ or than $l_p/2+l_p$. This procedure allows to avoid losing pixels when shifting each frame $F_{sel}$; in fact, when shifting pixels, one may lose a part of the corresponding frame $F_{sel}$ (namely, rows of pixels which would end up in the opposite direction of the one where the shifting step is performed, i.e. in the direction of the motion of space debris) thereby compromising the reliability of the stacking procedure. To avoid this inconvenience, by checking whether the values of the shifting distances $dx_Q$, $dy_Q$ fulfil the abovementioned requirements, rolling may have to be performed. It is noted that with this procedure the pixels that are rolled according to this procedure are background pixels, which do not have significant variations one from the other. Thus, the effect that may arise from this procedure is negligible.

Therefore, for instance, the map I $(T_1)_{sh}$ relative to the shifted frame $F_{sh1}$ is (eventually) rolled.

Following, a set of stacked frames $F_s$ is obtained as described in detail below.

In particular, after having rolled every map I $(T)_{sh}$ that needed to be rolled, a j-th stacked frame $F_{sj}$ (wherein j is a natural index ranging from 0 to $Q_{max}$) of the set of stacked frames $F_s$ is obtained according to Equation (4):

$$F_{sj} = \sum_{k=0}^{n} I(x + k \cdot dx_j,\ y + k \cdot dy_j,\ T_k) = I(t_0) + \sum_{k=1}^{n} I(T_k)_{shk} = F_0 + \sum_{k=1}^{n} F_{shk} \tag{4}$$

In other words, the j-th stacked frame $F_{sj}$ is given as the sum of the first frame $F_0$, which is the first selected frame, and n shifted frames $F_{shn}$, i.e. the shifted frames obtained from the further frames $F_{sel}'$ considering a corresponding j-th combination of shifting parameters $$|\vec{v_M}|,$$

$\theta_N$ (thereby generating shifting distances $dx_j$, $dy_j$) as well as the respective differences of time instants. Thus, for each set of values of the shifting parameters $$|\vec{v_M}|,$$

$\theta_N$ (and, thus, for each set of values of the shifting distances $dx_Q$, $dy_Q$), a corresponding stacked frame $F_s$ is generated; thus, given all the possible sets of values of the shifting parameters $$|\vec{v_M}|,$$

$\theta_N$, a corresponding first set of stacked frames $F_s$ is obtained.

For example, stacked frame $F_{s1}$ is given as the sum between the first frame $F_0$ and a corresponding set of shifted frames $F_{sh1}$-$F_{sh11}$ obtained by considering shifting distances $dx_1$, $dy_1$.

It is noted that, as clearly shown in Equation (4), the first frame $F_0$ is not shifted; this is due to the fact that the first frame $F_0$ is the frame wherein space debris is shown for the first time and it is used as a reference for the stacking procedure. Thus, each corresponding set of shifted frames $F_{sh}$ is stacked on top of the first frame $F_0$ such that the space debris, shown for the first time in frame $F_0$ and passing in the FoV of the device 2, is more visible. In other words, the principle underlying the stacking procedure is to shift pixels of each further frame $$F'_{sel}$$

according to pre-set sets of values of the shifting parameters $$|\overrightarrow{v_M}|$$

and $\theta_N$ (and, as such, of the corresponding set of values shifting distances $dx_Q$, $dy_Q$) and add the corresponding set of shifted frames $F_{sh}$ to the first frame $F_0$ so as to obtain, for each set of values of the shifting parameters $$|\overrightarrow{v_M}|$$

and $\theta_N$, a corresponding stacked frame $F_s$ thereby rendering the space debris more visible (i.e., by shifting backwards and, thus, returning to the position captured in frame $F_0$, the light signal representing the space debris is enhanced); this is furthermore evident from Equation (4) for the fact that the shifting distances $dx_Q$, $dy_Q$ are multiplied by the cardinality of the sum operation, i.e. since the frames shows a progression in time of the motion of the space debris, the shifting has to take into account this progression and, as such, correct the shifting distances $dx_Q$, $dy_Q$ by a constant, here the cardinality of each further frame $$F'_{sel},$$

to allow a substantial overlap of the pixels showing the space debris (i.e. luminous pixels) of each shifted frame $F_{sh}$ with the first frame $F_0$.

It is further noted that each stacked frame $F_{sj}$ is obtained by setting certain values of the, i.e. by selecting a specific combination of values; therefore, the stacking procedure has to be repeated for any further combinations of values of the shifting parameters $$|\overrightarrow{v_M}|$$

and $\theta_N$. In the end, a first set of stacked frames $F_s$ is obtained considering all the possible combinations of the shifting parameters $$|\overrightarrow{v_M}|$$

and $\theta_N$ (i. e., the multiplication between $N_{max}$ and $M_{max}$, here equal to ninety-six). Thus, the first set of stacked frames $F_s$ comprises ninety-six stacked frames, one for each combination of the shifting parameters $$|\overrightarrow{v_M}|$$

and $\theta_N$.

The stacking procedure has the advantage that the SNR of the first set of stacked frames $F_s$ is higher than the SNR of the subset of frames $F_{sel}$ (and, more in general, of the set of frames F); in particular, the stacking procedure allows to increment the SNR of the light signal associated with space debris by $$\sqrt{n},$$

since the background noise has a Poissonian behaviour and its fluctuations are of the order of $$\sqrt{n}$$

while the light signal of space debris follows a n trend and it is substantially coherent.

At the end of the stacking procedure, the device 2 transmits the first set of stacked frames $F_s$, processed the processing module 3. It is noted that the first set of stacked frames $F_s$ is stored e.g. in the internal storage of the device 2 and/or of the processing module 3, along with the values of speed $|\vec{v}|$ and angular direction θ associated with them.

According to step 40 of the present method, the first set of stacked frames $F_s$ is processed by the processing module 3, in particular by means of a CNN algorithm which is configured to classify each stacked frame $F_s$ to determine whether an object is visible, i.e. is crossing the FoV of the device 2 and thus if a stacked frame $F_s$ shows an image of the object.

According to an aspect of the present invention, the CNN algorithm used in the present method is a shallow-CNN algorithm (as the one, e.g., disclosed in "*Gradient-based learning applied to document recognition*" by Y. Lecun, L. Bottou, Y. Bengio and P. Haffner, https://nyuscholars.nyu.edu/en/publications/gradient-based-learning-applied-to-document-recognition), which, according to the Applicants' experience and tests, is particularly suitable for systems for telescopes with FPGAs, since shallow-CNN algorithms work with few parameters, thereby learning features from stacked frames, which easily allow the user to implement shallow-CNNs using only FPGAs and thus avoiding the necessity of deeper structures. According to the present invention, the shallow-CNN algorithm used herein uses 16,825 parameters (which characterise the neural network and are used when finding and fine tuning the model of the neural network) and is divided in layers, each of which gets involved with a limited number of parameters.

The shallow-CNN algorithm of present invention is configured to apply a model M, found in a previous training phase described for completeness in the following, to the first set of stacked frames $F_s$ and to classify, according to a plurality of classes, each stacked frame $F_s$; in particular, the shallow-CNN algorithm is here configured to classify each stacked frame $F_s$ according to a first and a second class $C_1$, $C_2$, wherein the first class $C_1$ is equal to 1 and the second class $C_2$ is equal to 0. Thus, the shallow-CNN implements a binary classification wherein the first class $C_1$ is associated with a first subset of stacked frames $F_s$, hereinafter referred to as good stacked frames $F_{s,g}$, wherein the object is visible in the FoV of the device 2 (i.e., bright pixels in the stacked frames $F_s$, indicating the presence of the object in the FOV of the device 2, are visible with respect to the background, the latter lacking bright pixels) and the second class $C_2$ is associated a second subset of stacked frames $F_s$, hereinafter referred to as bad stacked frames $F_{s,b}$, wherein the object is not visible in the FOV of the device 2 (i.e., bright pixels in a stacked frame $F_s$ are not visible, meaning that the object is absent in the FoV of the device 2), i.e. only background noise is shown. In other words, the first and second class $C_1$, $C_2$ are values respectively relating to the presence and the absence of objects in the FoV of the device 2. It is noted that the term bright pixels refers to pixels having an optical intensity which is higher with respect to the background; in other words, pixels having an optical intensity equal or higher than a threshold (e.g. in the case of the Mini-EUSO, 3% of the SBR) are considered as bright. Thus, the shallow-CNN algorithm is designed to determine whether in each stacked frame $F_s$ an image (i.e., a cluster of bright pixels) of an object in the FoV of the device 2 is present.

It is noted that, as is known to a skilled person, the classification by the shallow-CNN algorithm is carried out after an initial step, wherein the shallow-CNN algorithm is trained, validated and tested to determine the model that allows to perform said classification in the best and most efficient way, in particular in terms of computational time. Said initial step will be briefly discussed in the following to allow a better comprehension of the following steps of the present invention.

In the initial phase, the shallow-CNN algorithm is configured to consider a predetermined set of frames to be learnt in the training phase to use few max-pooling to avoid information loss and few filters for basic shapes in the frames.

In further detail, as in any CNN algorithm, the initial step comprises three sub-phases:

training phase, wherein the shallow-CNN algorithm is trained to generate a model M starting from a training data set $d_{train}$, which usually comprises a percentage of an initial data set $d_{in}$, the latter comprising a considerable number of frames to be analysed (e.g., approximately 6000 frames) that statistically covers the phase space, i.e. the space of all possible combinations of frames; in other words, the training phase allows to adjust the parameters of the shallow-CNN algorithm according to the necessities of the user and the input data (here, a percentage of the initial data set $d_{in}$);

validation phase, wherein a validation data set dval, which comprises the remaining percentage of the initial data set $d_{in}$ not used for the training phase, is used for validating the performance of the model M, thus verifying that the parameters set in the training phase are suitable even for the validation data set $d_{val}$, and finding any overfitting or loss of generalisation; and testing phase, wherein a test data set $d_{test}$, which includes unknown frames (i.e., frames which were not part of the initial data set $d_{in}$ and thus are not known to the shallow-CNN algorithm, hereinafter referred to as test frames $F_{test}$) and it is used to determine the accuracy and error of the shallow-CNN algorithm.

The abovementioned steps apply in particular for the shallow-CNN described herein.

In the training phase, according to an aspect of the present invention, a set of training frames $F_{train}$ (in this case, eighty) are provided and comprise:

frames reporting the motion of space debris, hereinafter referred to as $F_{SD}$, which was simulated through a software, for instance ESAF (i.e., EUSO Simulation and Analysis Framework, https://pos.sissa.it/358/252/, which is a simulator for space debris for the Mini-EUSO) having radius of space debris of 1 cm, a pixel position (in X and Y coordinates) of the space debris equal to ([12-34], [12-34]) (i.e., considering a square of pixels, wherein it is assumed that the space debris moves, starting from pixel [12, 12] up to pixel [34, 34], counting pixels from [0, 0] in a direction from the top left corner of the frame), a speed range between 5 and 12 km/s, an angular direction range from 0° to 360° and a height of 370 km; and frames relative to the background noise, hereinafter referred to as $F_{background}$ has been set to one count $pix^{-}1$ $(t)^{-1}$ (which is a normalized photon count $pix^{-1}(t)^{-1}$, i.e. a type of counting which is averaged over a long time scale, e.g. 40 ms for Mini-EUSO, on a single pixel and normalized on a short time scale, e.g. 2.5 μs in the case of the Mini-EUSO), i.e. a typical value for the background measures on oceans (chosen namely due to the UV nightglow and the absence of moonlight, i.e. it is similar to the night sky) when the device 2 is the Mini-EUSO.

It is noted that even the set of training frames $F_{train}$ undergo a stacking procedure as according to the method steps disclosed above; in particular, all frames $F_{SD}$, $F_{background}$ have been shifted in the with an angular direction $\theta_N$ ranging from 0° to 360° with a step of 15° and with a speed $$|\vec{v_M}|$$

ranging 5 to 12 km/s with a step of 2 km/s, thus obtaining four combinations of speed and twenty four combinations of directions, i.e. ninety six combinations of values of the shifting parameters $$|\vec{v_M}|$$

and $\theta_N$ in total. It is noted that the set of training stacked frames $F_{train,s}$ represent the initial data set $d_{in}$ to be fed as an input to the shallow-CNN algorithm.

Before inputting the sets of training stacked frames $F_{train,s}$ to the shallow-CNN algorithm, the set of training stacked frames $F_{train,s}$ are transformed in grey scale values, i.e. each training stacked frames $F_{train,s}$ is transformed to have pixel values between 0 and 1, using the formula in Equation (5):

$$GV = \frac{PV - mV}{MV - mV} \tag{5}$$

wherein PV is the pixel value, mV is the minimum value recorded in a pixel of each training stacked frames $F_{train,s}$ and MV is the maximum value recorded in a pixel of each training stacked frames $F_{train,s}$. After adapting the set of training stacked frames $F_{train,s}$ according to the grey scale value transformation, an high percentage, e.g. the 97%, of the initial data set $d_{in}$, i.e. the training data set $d_{train}$, is, as stated above, used for the training phase, so as to determine a model M; in particular, here the training data set $d_{train}$ comprises data relative to the set of training stacked frames $F_{train,s}$ that has been transformed according to the grey scale value transformation, which amount to about 500, of which half is made of a first subset of stacked frames training stacked frames Ftrain,s which are considered good (referred to as $F_{train,s,g}$), i. e. frames $F_{train,s,g}$ show bright pixels relative to the motion of the space debris, and a second subset of stacked frames training stacked frames $F_{train,s}$ which are considered bad (referred to as $F_{train,s,b}$), i.e. do not show bright pixels and are frames showing only the background.

It is noted that, the model M is determined by inputting the training data set $d_{train}$ as well as the set of values of the shifting parameters $$|\overrightarrow{v_M}|$$

and $\theta_N$ used for the shifting phase in the stacking procedure and the information regarding the nature of the sets of training stacked frames $F_{train,s}$ (i.e. whether they are good training stacked frames $F_{train,s,g}$ or bad training stacked frames $F_{train,s,b}$) which is also referred to as labelling. In other words, the model M is determined by knowing a priori whether each training stacked frame $F_{train,s}$ is good or bad, so that the shallow-CNN algorithm can adjust its parameters and determine the model M. In this way, the model M is adjusted so as to classify each training stacked frame $F_{train,s}$ according to the first or a second class $C_1$, $C_2$, associated respectively with good training stacked frames $F_{train,s,g}$ and bad training stacked frames $F_{train,s,b}$.

According to an aspect of the present invention, known software has been used for the purpose of finding and validating the model M.

The remaining percentage, e.g. 3%, of the initial data set $d_{in}$ is used for the validation phase, i.e. validation data set $d_{val}$, where the newly found model M is used to process the validation data set $d_{val}$, thereby evaluating the efficiency of the model M on a smaller, unlabelled portion of the initial data set $d_{in}$ and, eventually, the model M itself is updated if the previously set parameters of the model M do not perform well. It is noted that the validation data set $d_{val}$ comprises a set of training stacked frames $F_{train,s}$ which was not used for the previous training phase and, during the validation phase, is unlabelled.

It is noted that the Applicants, in the framework of finding the best CNN algorithm for the purpose of the present invention, changed the SBR of the set of training frames $F_{train}$ (in particular, of frames $F_{SD}$) to identify the CNN algorithm that would lead to the best results, especially when applied to an unknown data set (such as, e.g., the validation data set $d_{val}$); after several attempts, the shallow-CNN algorithm was found to be the best type of CNN algorithm to be used for the purpose of the present invention. This allows the present stack-CNN algorithm to be applied even in the case in which fainter objects move across the FoV of the device 2.

Now considering the testing phase, the shallow-CNN algorithm is tested over the test data set $d_{test}$, which is a new, unlabelled data set comprising a set of stacked test frames $F_{test,s}$, obtained through the stacking procedure described above from the set of test frames $F_{test}$ which were not previously used for any of the training and validation phases; in particular, the set of test frames $F_{test}$ comprise, e.g., thirty frames representative of the motion of the space debris (e.g., test frames $F_{SD,test}$ obtained through simulation similarly as frames $F_{SD}$) and thirty test background frames $F_{background,test}$, thereby having a total of sixty frames to be stacked and classified. It is noted that the set of stacked test frames $F_{test,s}$ underwent the same grey scale value transformation described by Equation (5) before being inputted to the shallow-CNN algorithm and processed using the model M.

After processing the test data set $d_{test}$ and providing the results (i.e., the binary response generated by the model M), the validation phase also provides a step of determining a True Positive Rate (TPR) and a False Positive Rate (FPR), both calculated for the all stacked test frames $F_{test,s}$. In particular, in some experiments, the Applicants have found that the present shallow-CNN algorithm is optimized over signals of the order of a SBR approximately of 3% (i.e., with a negligible fake events rate at the end of the whole procedure).

At the end of the initial step, the model M of the shallow-CNN algorithm has been found, trained, validated and test in terms of accuracy and ability to be able to properly classify any input data.

Therefore, again with reference to FIG. 3, step 40, a first trigger level step is carried out. In particular, the model M of the shallow-CNN algorithm is applied to the first set of stacked frames $F_s$, which have been previously transformed in grey scale values as according to Equation (5), to classify them according to the classes $C_1$, $C_2$, thereby distinguishing first and second subsets of stacked frames $F_s$, hereinafter referred to as a first set of good stacked frames $F_{s,g}$ and a first set of bad stacked frames $F_{s,b}$ respectively. Therefore, the first trigger level step generates first results, which comprise the first set of good stacked frames $F_{s,g}$, with the associated shifting parameters $$|\overrightarrow{v_M}|$$

and $\theta_N$, i. e. the frames of first set of stacked frames $F_s$ belonging to the first class $C_1$, and the first set of bad stacked frames $F_{s,b}$ with the associated shifting parameters $$|\overrightarrow{v_M}|$$

and $\theta_N$, i.e. the frames of the first set of stacked frames $F_s$ belonging to the second class $C_2$. In other words, the first results comprise the values associated with the classes $C_1$, $C_2$ and the stacked frames $F_s$, i.e. is a set of values between 0 (associated with the first set of bad stacked frames $F_{s,b}$) and 1 (associated with the first set of good stacked frames $F_{s,g}$). In other words, the first set of good stacked frames $F_{s,g}$ comprises the stacked frames $F_s$ wherein images of the object are visible, i.e. bright pixels are visible with respect to the background; thus, the model M is configured to find, in each stacked frame $F_s$, the images of the object (i.e., the bright pixels).

In order to prevent that the first set of bad stacked frames $F_{s,b}$ is stored in the processing module 3, the latter is configured to implement a verification step (step 50), wherein it is verified if the first results are above 0.5; in this way, the first set of good stacked frames $F_{s,g}$ is stored with the corresponding sets of shifting parameters $$|\overrightarrow{v_M}|$$

and $\theta_N$ associated therein, while the first set of bad stacked frames $F_{s,b}$ with the corresponding sets of shifting parameters $$|\overrightarrow{v_M}|$$

and $\theta_N$ associated therein are discarded, since the verification step selects only the values equal to 1 among the first results since they are the only results that satisfy the condition of step 50.

Thus, after the verification step, step 60, the processing module 3 stores the first set of good stacked frames $F_{s,g}$ and the corresponding sets of values for speed $$|\vec{v_M}|$$

and angular direction ON, referred to as speed $$|\vec{v_g}|$$

and angular direction $\theta_g$ in the following.

Given the sets of values of speed $$|\vec{v_g}|$$

and angular direction $\theta_g$, the present method further implements a further stacking procedure and a second trigger level step with the shallow-CNN algorithm, thereby further reducing the possibility of false positives at one per hour at most; this is particularly important for space applications, since, e.g., devices such as CAN (Coherent Amplpifying Network) lasers, which are novel high-efficiency fibre-based lasers, may be used to destroy space debris, found through the present method, on a collision course with operative satellites, thereby rendering fundamental to exactly know where the space debris will be. In fact, as observed by the Applicants in the experiments that led to the definition of the present method, false positives (i.e., bad stacked frames $F_{s,b}$ determined as belonging to the first class $C_1$) by the model M hold brighter pixels which mislead the shallow-CNN algorithm in the classification; this also means that the stacking procedure generates a set of stacked frames $F_s$ which are overlays of positive fluctuations in the space of all possible combinations between each frame $F_{sel}$ and any combination of the shifting parameters $$|\vec{v_M}|$$

and $\theta_N$. Thus, the method according to the present invention exploits the difference between space debris, which have a coherent movement for a long time, and background noise by implementing method steps 70-100 of FIG. 3.

It is noted that, in order to reduce the computational time and to have a light architecture, the shallow-CNN algorithm and the model M used hereinafter are the same as the ones used for the first trigger level step.

In particular, step 70, the set of frames F stored in step 10 of the present method all undergo the stacking procedure as disclosed in the previous paragraphs (in particular, with reference to step 30); here, the sets of values of the shifting parameters $$|\vec{v_M}|$$

and $\theta_N$ are the ones that were stored in the processing module 3 at step 60, i. e. sets of values of speed $$|\vec{v_g}|$$

and angular direction $\theta_g$ which are associated with the first set of good stacked frames $F_{s,g}$. Here, for instance, the number of combinations between the shifting parameters $$|\vec{v_g}|$$

and $\theta_g$ is e.g. nine (i.e., three possible values for speed $$|\vec{v_g}|$$

and three possible values for the angular direction $\theta_g$), thus generating corresponding combinations (and, thus, sets of values) of shifting distances $dx_A$, $dy_A$, A being a natural index ranging from 0 to $A_{max}$, the latter being the maximum number of values that can be assumed by the shifting distances $dx_A$, $dy_A$ (here nine); in other words, for each combination/set of values of the shifting parameters speed $$|\vec{v_g}|$$

and angular direction $\theta_g$, the stacking procedure generates a corresponding second set of stacked frames $F_{s,n}$ by shifting each frame F according to any possible combination of values of the shifting parameters $$|\vec{v_g}|$$

and $\theta_g$ thereby generating second sets of shifted frames $F_{sh,n}$ for each combination of values of the shifting parameters $$|\vec{v_g}|$$

and $\theta_g$. Each shifted frame $F_{sh,n}$ is thus stacked on top of the first frame $F_0$ as according to the procedure described with reference to step 30 and to Equation (5). Thus, the second set of stacked frames $F_{s,n}$ (examples of which are analogous to the ones shown in FIG. 4A) comprises a number of frames $F_{s,n}$ which is equal to the number of sets of values of the shifting parameters $$|\vec{v_g}|$$

and $\theta_g$, i.e. nine. In other words, in this way, it is possible to use the same procedure as disclosed above but for a range of time units, i.e. the periodicity t or, in the case of the Mini-EUSO, GTUs, which is larger than the one used in step 30 of the present method.

Following the stacking procedure, step 80, the second set of stacked frames $F_{s,n}$ are inputted to the shallow-CNN algorithm for the classification, thereby implementing the second trigger level step; it is noted that, before classifying the second set stacked frames $F_{s,n}$, the latter are transformed in grey scale values in the same way as disclosed above with reference to Equation (5). It is further noted that the model M applied in the first trigger level step is the same as the one applied in the second trigger level step, i.e. to the second set of stacked frames $F_{s,n}$, thereby finding a first subset of the second set of stacked frames $F_{s,n}$ belonging to the first class $C_1$ (i.e., second set of good stacked frames $F_{s,n,g}$ which is analogous to the first set of good stacked frames $F_{s,g}$ shown in FIG. 4B) and a second subset of the second set of stacked frames $F_{s,n}$ belonging to the second class $C_2$ (i.e., second set of bad stacked frames $F_{s,n,b}$, which is analogous to the first set of bad stacked frames $F_{s,b}$ shown in FIG. 4C).

In this way, the present method allows to perform a fine tuning procedure to the whole set of acquired and stored set of frames F after the first trigger level step, the latter being used for finding the best combinations of values for the shifting parameters $$|\vec{v_g}|$$

and $\theta_g$ (i.e., the sets of values of the shifting parameters $$|\vec{v_M}|$$

and $\theta_N$ that are associated with the first set of good stacked frames $F_{s,g}$) and, thus, avoiding to use a high number of combinations of shifting parameters, thus enhancing optimised combinations between each frame F and the sets of values of shifting parameters $$|\vec{v_g}|$$

and $\theta_g$ by incrementing the contrast between a spot indicative of space debris and the background noise.

At the end of the second trigger level step, the model M of the shallow-CNN algorithm generates second results, which comprise the second set of good stacked frames $F_{s,n,g}$, with the corresponding sets of values of shifting parameters $$|\vec{v_g}|$$

and $\theta_g$, i.e. the subset of the second set of stacked frames $F_{s,n}$ belonging to the first class $C_1$, and the second set of bad stacked frames $F_{s,n,b}$ with the associated combinations of values of the shifting parameters $$|\vec{v_g}|$$

and $\theta_g$, i.e. the subset of the second set of stacked frames $F_{s,n}$ belonging to the second class $C_2$. Thus, once again, the model M determines whether, in a stacked frame $F_{s,n}$, an image of the object is present or not.

Further, the second results generated in the previous step are further verified by the processing module 3 in a similar way as performed in step 50; in particular, the processing module 3 verifies if the second results are above 0.5 (step 90). In this way, the subset of the second set of stacked frames $F_{s,n}$ associated with the first class $C_1$(i.e., the second set of good stacked frames $F_{s,n,g}$) are stored along with the associated sets of values of shifting parameters $$|\vec{v_g}|,$$

$\theta_g$, while the subset of the second set of stacked frames $F_{s,n}$ associated with the second class $C_2$ (i.e., the second set of bad stacked frames $F_{s,n,b}$) are discarded along with the associated combinations of values of shifting parameters $$|\vec{v_g}|,$$

$\theta_g$ (step 100).

According to the present invention, the method further implements a final verification step for the purpose of further verifying that the second set of good stacked frames $F_{s,n,g}$ and the first set of good stacked frames $F_{s,g}$ truly show the space debris passing on the FoV of the device 2, i.e. meet a requirement regarding the position and the optical intensity of the image of the object found in both the first and the second sets of good stacked frames $F_{s,g}$ and $F_{s,n,g}$. In particular, according to step 110, each frame of the first and the second sets of good stacked frames $F_{s,g}$ and $F_{s,n,g}$ stored in steps 60 and 100, i.e. each frame of the first and the second sets of stacked frames $F_s$ and $F_{s,n}$ belonging to the first class $C_1$ and thus found to be good in the first and the second trigger level steps of the present method respectively, are overlapped to verify that an overlapping maximum (i.e., the maximum intensity associated with the light signals in each frame of the first and the second sets of good stacked frames $F_{s,g}$ and $F_{s,n,g}$) is present in both frames of both sets of good stacked frames $F_{s,g}$ and $F_{s,n,g}$ in the same position given a neighbourhood of at most two pixels, i.e. if the light signals shown as bright pixels (i.e., the image of the object, since the stacking steps allowed to make them stand out from the background), associated with the space debris, shown in each frame of the first and the second sets of good stacked frames $F_{s,g}$, $F_{s,n,g}$ are shown approximately in the same position and correspond to the brightest pixels in each good stacked frames $F_{s,g}$, $F_{s,n,g}$. For example, considering that the good stacked frames $F_{s,g}$, $F_{s,n,g}$ are both grey scaled, the verification step 110 verifies if pixels having maximum intensity, associated with one, are shown approximately in the same position in every good stacked frames $F_{s,g}$, $F_{s,n,g}$. In other words, according to an aspect of the present method, the verification step at block 110 allows to verify if the maximum intensity of pixels in each frame of the first and the second sets of good stacked frames $F_{s,g}$, $F_{s,n,g}$ is in the same position (determined, e.g., as X and Y coordinates) given any range of confidentiality (e.g., the condition of regarding the position, which is evaluated considering a neighbourhood of at most two pixels) and, as such, can be considered representing the images of the object shown in the frames of the first and the second sets of good stacked frames $F_{s,g}$, $F_{s,n,g}$; thus, in step 110, a requirement regarding the position of the image of the object and, more in detail, of the maximum intensity is satisfied for all good stacked frames $F_{s,g}$, $F_{s,n,g}$. It is noted that, since the good stacked frames $F_{s,g}$, $F_{s,n,g}$ have been grey scaled, the intensity of the pixels is evaluated on normalized good stacked frames $F_{s,g}$, $F_{s,n,g}$. Furthermore, according to a further aspect of the present invention, it is also noted that the stacked frames $F_{s,g}$, $F_{s,n,g}$ have the same dimensions, i.e. the respective maps $I(t)_{s,g}$ and $I(t)_{s,n,g}$ have the same dimension, and thus they can be easily compared one another.

Thus, the verification step 110 aims at verifying if, in the first and second good stacked frames $F_{s,g}$, $F_{s,n,g}$, a maximum intensity of the pixels is detected in the same position in all of the good stacked frames $F_{s,g}$, $F_{s,n,g}$, given a confidentiality range; if so, then it is determined that the device 2 detects and object moving coherently in its FoV, i.e. the set of frames F actually show the motion of the object in the FoV of the device 2.

In this way, the processing module 3 further verifies that each frame of the first and the second sets of good stacked frames $F_{s,g}$ and $F_{s,n,g}$ have bright pixels (i.e., pixels showing the light signal of the space debris and having an intensity) that are positioned in a certain area of the each good stacked frame $F_{s,g}$ and $F_{s,n,g}$, thereby verifying that any maximum intensity in the good stacked frames $F_{s,g}$, $F_{s,n,g}$ is in the same position, thus indicating the presence of an object since, if said requirements are valid, then it means that each frame F shows the object in a different position according to a coherent motion.

If the requirement of the verification step at block 110 is fulfilled, i.e. the positions and the optical intensities of the images of the objects in each good stacked frame $F_{s,g}$, $F_{s,n,g}$ is the same and thus the requirement is fulfilled for each good stacked frame $F_{s,g}$, $F_{s,n,g}$, given any confidentiality range, then the object is deemed to be found (block 120). As a consequence, according to an embodiment of the present invention, the processing module 3 is further configured to notify the user of a found space debris. For instance, the processing module 3 may be configured to send the notification not only to the user for information purposes but also to other electronic devices, such as computers, tablets, smartphones, etc., to trigger further actions by the latter. For instance, the processing module 3 is configured to send the notifications to the computers controlling the position and the activation of a CAN laser for eliminating any space debris that is in the course of collision with a satellite.

The method and the related system disclosed above have numerous advantages.

In particular, the present method does not have the constraint of knowing the trajectory of the object passing on the FoV of the device 2, since the shallow-CNN algorithm of the present method is able to autonomously find the good stacked frames among several acquired frames that underwent the stacking procedure described above. According to the present invention, the computational time is reduced thanks to the double trigger lever structure of the present method, wherein:

- in the first trigger level, the stack-CNN algorithm, in particular the shallow-CNN algorithm, finds the first set of good stacked frames $F_{s,g}$ and the corresponding set of values of the shifting parameters $$|\vec{v_M}|$$

and $\theta_N$ from a restricted pool, i.e. the subset of frames $F_{sel}$ (thereby reducing the computational time needed to obtain the first results) and irrespective of the fact that the light signal relating to the object perfectly overlaps (given a confidentiality range of pixels where the object is supposed to be) in each frame $F_{sel}$; and

- in the second trigger level, the stack-CNN algorithm, in particular the corresponding stacking procedure performs a fine tuning around the selected combination of values of the shifting parameters $$|\vec{v_g}|,$$

$\theta_g$ on the whole set of frames F acquired by the device 2, in order to find the objects and match their real motion.

In other words, the present method allows to reduce the computational burden on the system by considering (i.e. selecting) only a subset of the set of frames F for determining the relevant shifting parameters for identifying the motion (i.e. trajectory and speed) of the observed objects. In particular, the abovementioned subset of frames F may be selected arbitrarily.

Furthermore, when the device 2 is the Mini-EUSO telescope, the present method is substantially more performing than standard methods, such as the ones used as of now for the Mini-EUSO. This is due to the fact that, while the present method looks for an object in space moving at least for five consecutive frames F in the focal surface detector 5 of the device 2, faint light signals might be missed with conventional, threshold techniques; this does not happen with the present method thanks to the stack-CNN algorithm and the double trigger level steps, thereby allowing to find even more objects in space which might have not been catalogued yet.

Furthermore, the present method allows to enhance the performance results obtained through the stacking procedure by adding the shallow-CNN algorithm, especially in terms of computational time and SNR. In fact, the shallow-CNN algorithm, having a limited number of characterising parameters, does not need a great amount of time to perform the first and the second trigger level steps, unlike other, more complex and deeper neural networks. Furthermore, the lightness of the architecture shallow-CNN algorithm is suitable for implementing it in an FPGA such as the FPGA 7 of the device 2 when the FPGA 7 operates as the processing module 3.

Furthermore, as found by the Applicants, the present method can detect objects in a condition of SBR (and, thus, SNR) which is approximately three times lower than more conventional methods, thereby being more efficient.

Furthermore, the stack-CNN method disclosed herein allows to reduce the fake trigger rate, i.e. the number of false positives is significantly reduce thanks to verification steps at blocks 50, 90 and 110. This mechanism helps to avoid false positives coming from overlaying of positive fluctuations and on the contrary enhances the detection of the point-like source if this stands in the field of view for many frames.

Finally, it is clear that modifications and variations can be made to the method and the related system described and illustrated here without departing from the protective scope of the present invention, as defined in the attached claims.

For instance, the present method may be applied for point-like sources with known trajectories. Furthermore, the present system may comprise more than one device 2 thereby covering multiple portions of the observable space. Additionally, in the case of non-point-like sources, i. e. extended sources, the presently described stack-CNN algorithm is also valid; in particular, further modifications may be necessary according to the type of extended source (e.g., if the source covers a small area of pixels in a frame F, an average operation may be carried out to reduce the occupied area to one pixel, thereby treating the extended source as a point-like source).

Furthermore, the present system 1 may be operated offline, thereby being a powerful and autonomous technique in data analysis; furthermore, new applications could be explored for researching other sources that move not only linearly but more generally with different known trajectories, such as asteroids or meteors or even aircraft moving in the FoV of the device 2.

The present method may also be implemented in different systems, such as FPGAs, thereby being an autonomous trigger system to mount on board of further telescope. The advantage of this implementation allows to reduce the computational time making the overall system faster than the ones known in the prior art.

In addition, the CNN algorithm might be different from the shallow-CNN algorithm described herein, for example Support Vector Machine (SVM) algorithm.

Furthermore, e.g. in the case of sources moving in a non-linear way, the number of shifting parameters may be increased to better represent such trajectory.

The invention claimed is:

1. Computer-implemented method for detecting objects in the field of view of an optical detection device (2) comprising:

acquiring (10), through the optical detection device (2), a plurality of subsequent frames (F) of a portion of an observed space in a time interval (T), wherein each frame (F) is acquired in a corresponding time instant ($T_k$) of the time interval (T);

selecting (20) a subset of frames ($F_{sel}$) from the plurality of frames (F);

for each set of values of shifting parameters $$(|\vec{v_M}|, \theta_N)$$

of a plurality of sets of values of shifting parameters $$(|\vec{v_M}|, \theta_N)$$

that are indicative corresponding predetermined motions of an object with respect to the optical detection device (2), determining (30) a corresponding first stacked frame ($F_s$, $F_{s,g}$, $F_{s,b}$) on the basis of the subset of frames ($F_{sel}$) and as a function of the set of values of the shifting parameters $$(|\vec{v_M}|, \theta_N);$$

for each first stacked frame ($F_s$, $F_{s,g}$, $F_{s,b}$), determining (40, 50, 60) whether the first stacked frame ($F_s$, $F_{s,g}$, $F_{s,b}$) belongs to a first or a second class ($C_1$, $C_2$), wherein the first and the second class are respectively indicative of the presence or absence of an image of an object in the first stacked frame ($F_s$, $F_{s,g}$, $F_{s,b}$); and selecting, among said sets of values of shifting parameters $$(|\vec{v_g}|, \theta_g),$$

each set of values of shifting parameters that is associated to corresponding first stacked frame ($F_s$, $F_{s,g}$) classified as belonging to the first class ($C_1$), the method further comprising, for each selected set of values of shifting parameters $$(|\vec{v_g}|, \theta_g):$$

determining (70) a corresponding second stacked frame ($F_{s,n}$, $F_{s,n,g}$, $F_{s,n,b}$) on the basis of the set of frames (F) and as a function of the selected set of values of shifting parameters $$(|\vec{v_g}|, \theta_g);$$

for each second stacked frame ($F_{s,n}$, $F_{s,n,g}$, $F_{s,n,b}$), determining (80, 90, 100) whether the second stacked frame ($F_{s,n}$, $F_{s,n,g}$, $F_{s,n,b}$) belongs to a third or a fourth class ($C_1$, $C_2$) wherein the third and the fourth class are respectively indicative of the presence or absence of an image of an object in the second stacked frame ($F_{s,n}$, $F_{s,n,g}$, $F_{s,n,b}$);

determining (110) if the first stacked frame ($F_s$, $F_{s,g}$) classified as belonging to the first class ($C_1$) and in the second stacked frame ($F_{s,n}$, $F_{s,n,g}$, $F_{s,n,b}$) classified as belonging to the third class ($C_1$) meet a requirement; and if said requirement is met, indicate (120) the presence of an object, wherein each of said predetermined motions has a corresponding trajectory and a corresponding speed, and wherein each of said set of values of the shifting parameters $$(|\vec{v_M}|, \theta_N)$$

comprise values indicating the trajectory and the speed of the corresponding motion.

2. Computer-implemented method for detecting objects in the field of view of the optical detection device (2) according to claim 1, wherein the objects are point-like objects.

3. Computer-implemented method for detecting objects in the field of view of the optical detection device (2) according to claim 1, wherein said values indicating the trajectory comprise values of angular direction $$(|\vec{v_M}|, \theta_N).$$

4. Computer-implemented method for detecting objects in the field of view of the optical detection device (2) according to claim 1, wherein the subset of frames ($F_{sel}$) comprising a respective first frame ($F_0$) and a respective set of additional frames ($F_{sel}'$), and wherein the step of determining (30) the corresponding first stacked frame ($F_s$, $F_{s,g}$, $F_{s,b}$) on the basis of the subset of frames ($F_{sel}$) and as a function of each set of values of the shifting parameters $$(|\vec{v_M}|, \theta_N)$$

comprises, for each set of values of the shifting parameters $$(|\vec{v_M}|, \theta_N):$$

determining (30) a corresponding first set of values of shifting distances (dx, dy) as a function of the set of values of the shifting parameters $$(|\vec{v_M}|, \theta_N);$$

shifting (30) the pixels of each additional frame ($F_{sel}'$) as a function of the first set of values of the shifting distances (dx, dy) and of a time difference between the time instant of the first frame ($F_0$) of the subset of frames ($F_{sel}$) and the time instant of the additional frame ($F_{sel}'$), to obtain a corresponding first set of shifted frame ($F_{sh}$); and stacking (30) said corresponding first set of shifted frames ($F_{sh}$) with the first frame ($F_0$) of the subset of frames ($F_{sel}$) to obtain the first stacked frame.

5. Computer-implemented method for detecting objects in the field of view of the optical detection device (2) according to claim 4, wherein the set of frames (F) comprises a respective first frame ($F_0$) and a set of additional frames (FB) and wherein, for each selected set of values of shifting parameters $$(|\vec{v_g}|, \theta_g),$$

the step of determining (70) the corresponding second stacked frame ($F_{s,n}$, $F_{s,n,g}$, $F_{s,n,b}$) on the basis of the set of frames (F) and as a function of the selected set of values of shifting parameters $$(|\vec{v_g}|, \theta_g)$$

comprises, for each selected set of values of shifting parameters $$(|\vec{v_g}|, \theta_g):$$

determining (70) a corresponding second set of values of shifting distances (dx, dy) as a function of the selected set of values of shifting parameters $$(|\vec{v_g}|, \theta_g);$$

shifting (70) the pixels of each additional frame ($F_B$) as a function of the second set of values of the shifting distances (dx, dy) and of a time difference between the time instant of the first frame ($F_0$) of the set of frames (F) and the time instant of the additional frame ($F_B$), to obtain a corresponding second set of shifted frames ($F_{sh}$); and stacking (70) said corresponding second set of shifted frames ($F_{sh}$) with the first frame ($F_0$) of the set of frames (F) to obtain the corresponding second stacked frame ($F_{s,n}$, $F_{s,n,g}$, $F_{s,n,b}$).

6. Computer-implemented method for detecting objects in the field of view of the optical detection device (2) according to claim 1, wherein the step of determining (110) if the first stacked frame ($F_s$, $F_{s,g}$) classified as belonging to the first class ($C_1$) and the second stacked frame ($F_{s,n}$, $F_{s,n,g}$, $F_{s,n,b}$) classified as belonging to the third class ($C_1$) meet a requirement comprises:

verifying if the maximum intensities of the first ($F_s$, $F_{s,g}$) and second stacked frames ($F_s$, $F_{s,g}$, $F_{s,b}$) classified as belonging, respectively, to the first and the third class ($C_1$) are located in positions which fall within a confidentiality range;

if said maximum intensities are located in positions which fall within a confidentiality range, identifying said maximum intensities as forming corresponding images of the object; and determining that the pixels of the stacked frames ($F_s$, $F_{s,g}$) of the corresponding first set of stacked frames ($F_s$, $F_{s,g}$, $F_{s,b}$) classified as belonging to the first class ($C_1$) and of pixels of stacked frames ($F_{s,n}$, $F_{s,n,g}$, $F_{s,n,b}$) of the corresponding second set of stacked frames ($F_{s,n}$, $F_{s,n,g}$, $F_{s,n,b}$) represent the image of the object.

7. Computer-implemented method for detecting objects in the field of view of the optical detection device (2) according to claim 6, wherein the step of verifying if the maximum intensities of the first ($F_s$, $F_{s,g}$) and second stacked frames ($F_s$, $F_{s,g}$, $F_{s,b}$) classified as belonging, respectively, to the first and the third class ($C_1$) are located in positions which fall within a confidentiality range comprises overlapping (110) the first stacked frame ($F_s$, $F_{s,g}$) classified as belonging to the first class ($C_1$) with the second stacked frame ($F_{s,n}$, $F_{s,n,g}$, $F_{s,n,b}$).

8. System for detecting objects in the field of view of an optical detection device (2) comprising at least one processor and at least one memory that stores executable instructions that, when executed by the at least one processor, cause the processor to carry out the method according to claim 7.

9. Software loadable in a system (1) for detecting objects in the field of view of an optical detection device (2), the system comprising at least one processor and at least one memory, the software comprises executable instructions stored in the at least one memory that, when executed by the at least one processor, cause the processor to implement the method according claim 1.

10. Computer-readable medium storing the software according to claim 9.

* * * * *